(12) United States Patent
Orr

(10) Patent No.: US 10,828,780 B2
(45) Date of Patent: Nov. 10, 2020

(54) AIRPLANE PASSENGER SERVICE ROBOT

(71) Applicant: The Boeing Company, Chicago, IL (US)

(72) Inventor: Matthew W. Orr, Chicago, IL (US)

(73) Assignee: The Boeing Company, Chicago, IL (US)

( * ) Notice: Subject to any disclaimer, the term of this patent is extended or adjusted under 35 U.S.C. 154(b) by 292 days.

(21) Appl. No.: 15/952,409

(22) Filed: Apr. 13, 2018

(65) Prior Publication Data

US 2019/0314993 A1    Oct. 17, 2019

(51) Int. Cl.
*B25J 9/16* (2006.01)
*G05D 1/02* (2020.01)
*B25J 11/00* (2006.01)

(52) U.S. Cl.
CPC ........... *B25J 9/1674* (2013.01); *B25J 9/1697* (2013.01); *B25J 11/008* (2013.01); *G05D 1/0246* (2013.01); *G05D 1/0255* (2013.01); *G05D 1/0257* (2013.01); *Y10S 901/01* (2013.01); *Y10S 901/09* (2013.01); *Y10S 901/31* (2013.01); *Y10S 901/46* (2013.01); *Y10S 901/47* (2013.01)

(58) Field of Classification Search
CPC ............... B25J 9/16; B25J 11/00; G05D 1/02
See application file for complete search history.

(56) References Cited

U.S. PATENT DOCUMENTS

| 3,179,208 | A | 4/1965 | Umanoff | |
|---|---|---|---|---|
| 10,482,550 | B1 * | 11/2019 | Theobald | B25J 11/008 |
| 2008/0077511 | A1 * | 3/2008 | Zimmerman | G06Q 10/00 705/28 |
| 2008/0216368 | A1 * | 9/2008 | Delamere | G09F 7/22 40/590 |
| 2010/0224727 | A1 * | 9/2010 | Bauer | B64D 11/0015 244/118.5 |
| 2014/0074287 | A1 * | 3/2014 | LaFary | B25J 9/1676 700/253 |
| 2016/0200439 | A1 | 7/2016 | Appolt | |
| 2019/0022850 | A1 * | 1/2019 | Luo | B25J 5/007 |

OTHER PUBLICATIONS

"In-flight food from the floor: Firm files patent for a bizarre sushi-style conveyor belt that can be used on planes", : http://www.dailymail.co.uk/sciencetech/article-3074222/In-flight-food-floor-Firm-files-patent-bizarre-sushi-style-conveyor-belt-used-planes.html, retrieved Apr. 12, 2018.

* cited by examiner

*Primary Examiner* — Kira Nguyen
(74) *Attorney, Agent, or Firm* — McDonnell Boehnen Hulbert & Berghoff LLP

(57) ABSTRACT

An example robotic system includes (a) a housing having a first surface, (b) one or more sensors coupled to the housing, (c) a first wheel and a second wheel coupled to and extending away from the housing, (d) a motor configured to drive at least one of the first wheel and the second wheel, and (e) data storage including program instructions stored thereon that when executed by one or more processors of the robotic system while operating in an environment, cause the robotic system to perform operations comprising: (i) controlling the motor to cause the robotic system to navigate on a surface within the environment based, (ii) detecting, using the one or more sensors, an object approaching the robotic system and responsively controlling the motor to cause the robotic system to cease movement, and (iii) retracting the first wheel and the second wheel into the housing.

20 Claims, 10 Drawing Sheets

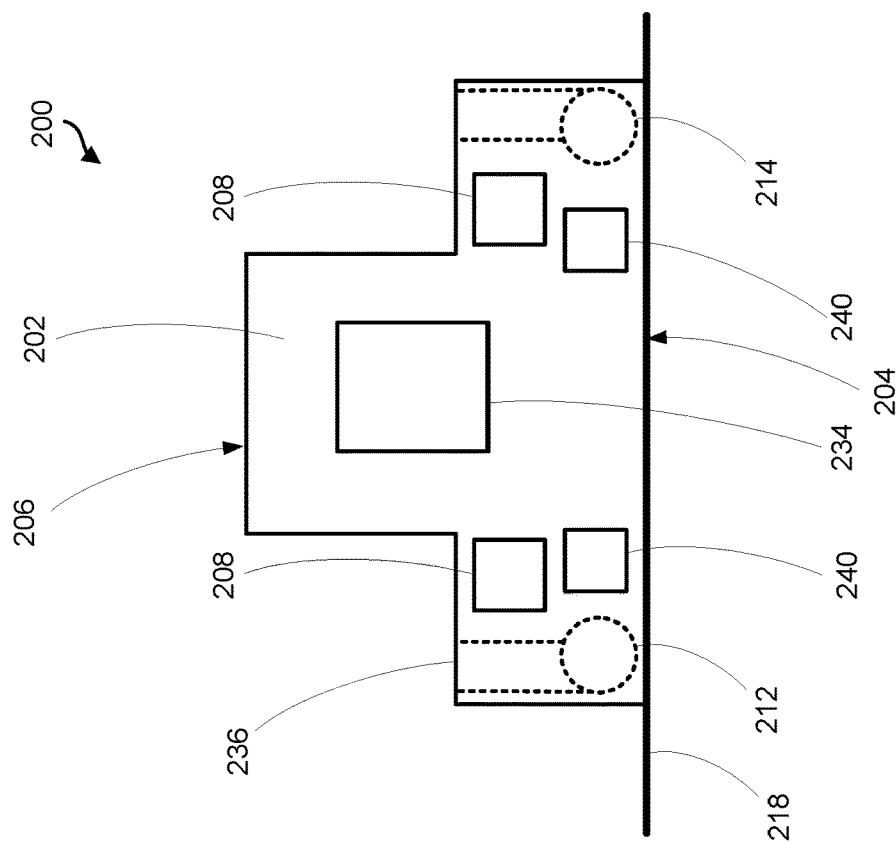
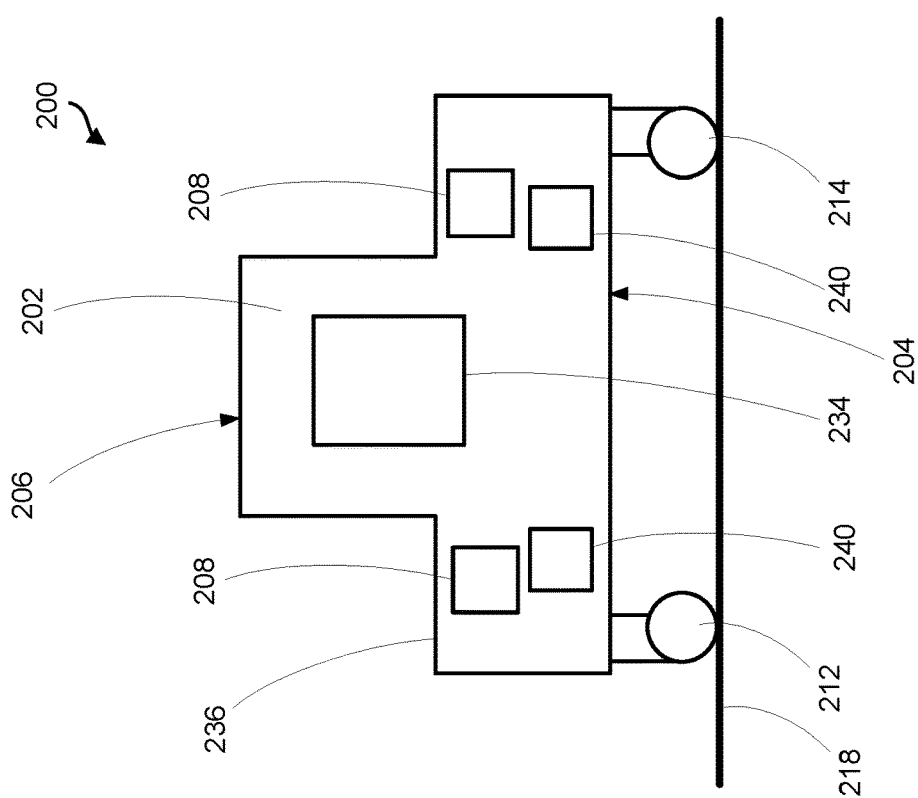

AIRPLANE PASSENGER SERVICE ROBOT

FIELD

The present disclosure relates generally to robotic systems and methods of use thereof, and more particularly, to robotic systems configured to operate in an aisle of an aircraft and configured to be stepped on to allow passage of a passenger in the aisle.

BACKGROUND

Service carts are commonly used in a variety of commercial airlines to assist flight attendants and in providing food and drink items to passengers. The current service paradigm requires the flight attendants to move the cart and stop their service to allow passengers to pass or for the passengers to simply wait. This interrupts the passenger service and results in flight attendants pushing a heavy cart up and down the aisle multiple times during the service. In a single-aisle airplane, this also results in lengthy periods of the flight when forward passengers cannot access lavatories during flight.

Accordingly, there is a need for a system to deliver service items to passengers upon passenger demand and further to allow for passage of passengers in the aisle.

SUMMARY

In one aspect, a robotic system is described. The robotic system includes (a) a housing having a first surface and a second surface opposite the first surface, (b) one or more sensors coupled to the housing, (c) a first wheel and a second wheel coupled to and extending away from the first surface of the housing, (d) a motor configured to drive at least one of the first wheel and the second wheel, and (e) data storage including program instructions stored thereon that when executed by one or more processors of the robotic system while operating in an environment, cause the robotic system to perform operations comprising (i) controlling the motor to cause the robotic system to navigate on a surface within the environment based on data received from the one or more sensors, (ii) detecting, using the one or more sensors, an object approaching the robotic system and responsively controlling the motor to cause the robotic system to cease movement, and (iii) retracting the first wheel and the second wheel into the housing such that the first surface of the housing is substantially flush with the surface within the environment.

In another aspect, a method is described. The method includes (a) operating a robotic system on a surface in an environment, wherein the robotic system includes (i) a housing having a first surface, (ii) one or more sensors coupled to the housing, (iii) a first wheel and a second wheel coupled to and extending away from the first surface of the housing, and (iv) a motor configured to drive at least one of the first wheel and the second wheel, (b) detecting, using the one or more sensors, an object approaching the robotic system and responsively controlling the motor to cause the robotic system to cease movement, and (c) retracting the first wheel and the second wheel into the housing such that the first surface of the housing is substantially flush with the surface within the environment.

In yet another aspect, a non-transitory computer readable medium is described. The non-transitory computer readable medium has instructions stored thereon, that when executed by one or more processors, cause a robotic system to perform operations comprising (a) operating a robotic system on a surface in an environment, wherein the robotic system includes (i) a housing having a first surface, (ii) one or more sensors coupled to the housing, (iii) a first wheel and a second wheel coupled to and extending away from the first surface of the housing, and (iv) a motor configured to drive at least one of the first wheel and the second wheel, (b) detecting, using the one or more sensors, an object approaching the robotic system and responsively controlling the motor to cause the robotic system to cease movement, and (c) retracting the first wheel and the second wheel into the housing such that the first surface of the housing is substantially flush with the surface within the environment.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures.

FIG. 4A is a side view of the example robotic system of FIGS. 2A-2B with the wheels extended, according to an example embodiment.

FIG. 4B is a side view of the example robotic system of FIGS. 2A-2B with the wheels retracted, according to an example embodiment.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 1:
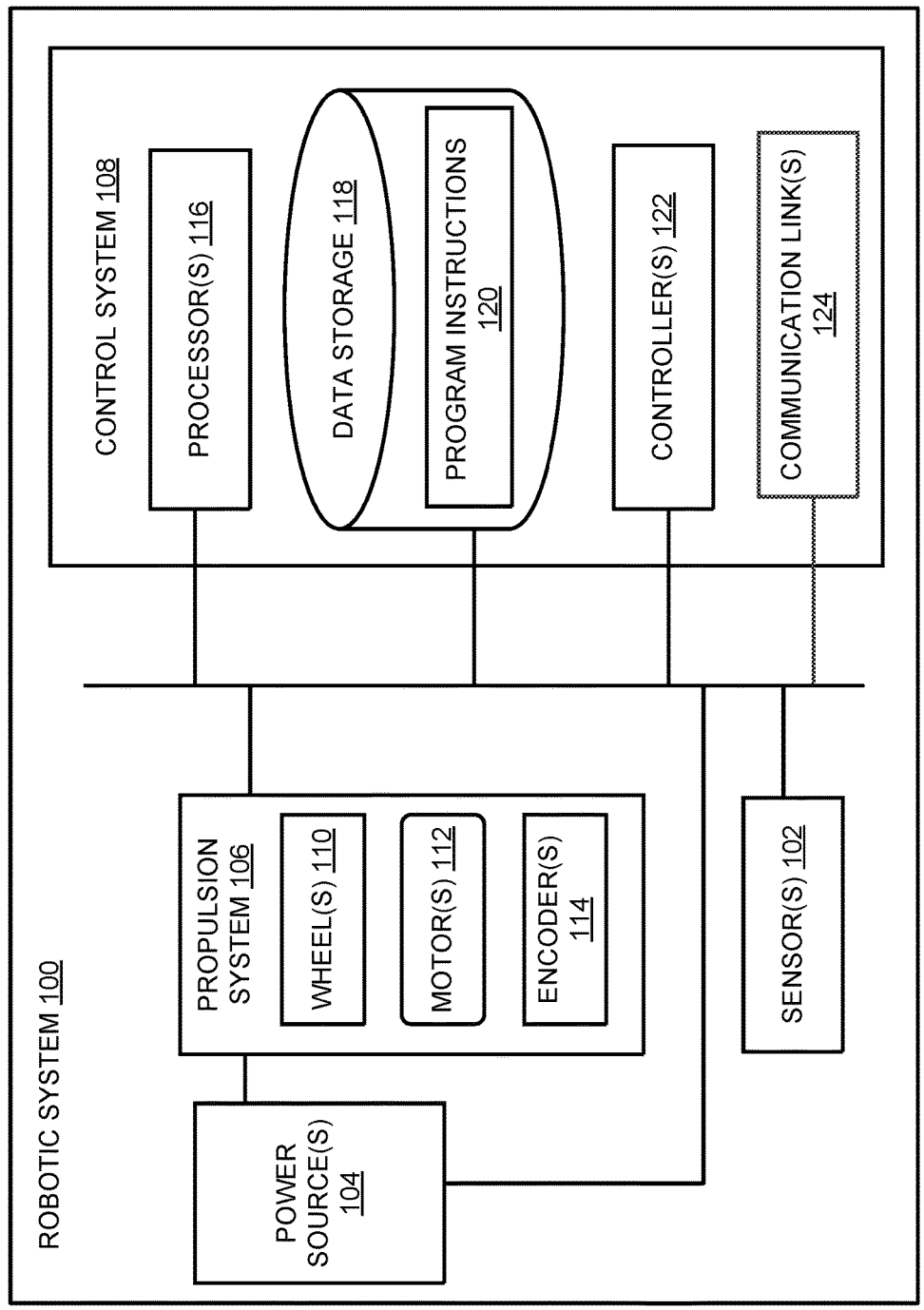
FIG. 1 is a block diagram of an example robotic system, according to an example embodiment.

In FIG. 1, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 8:
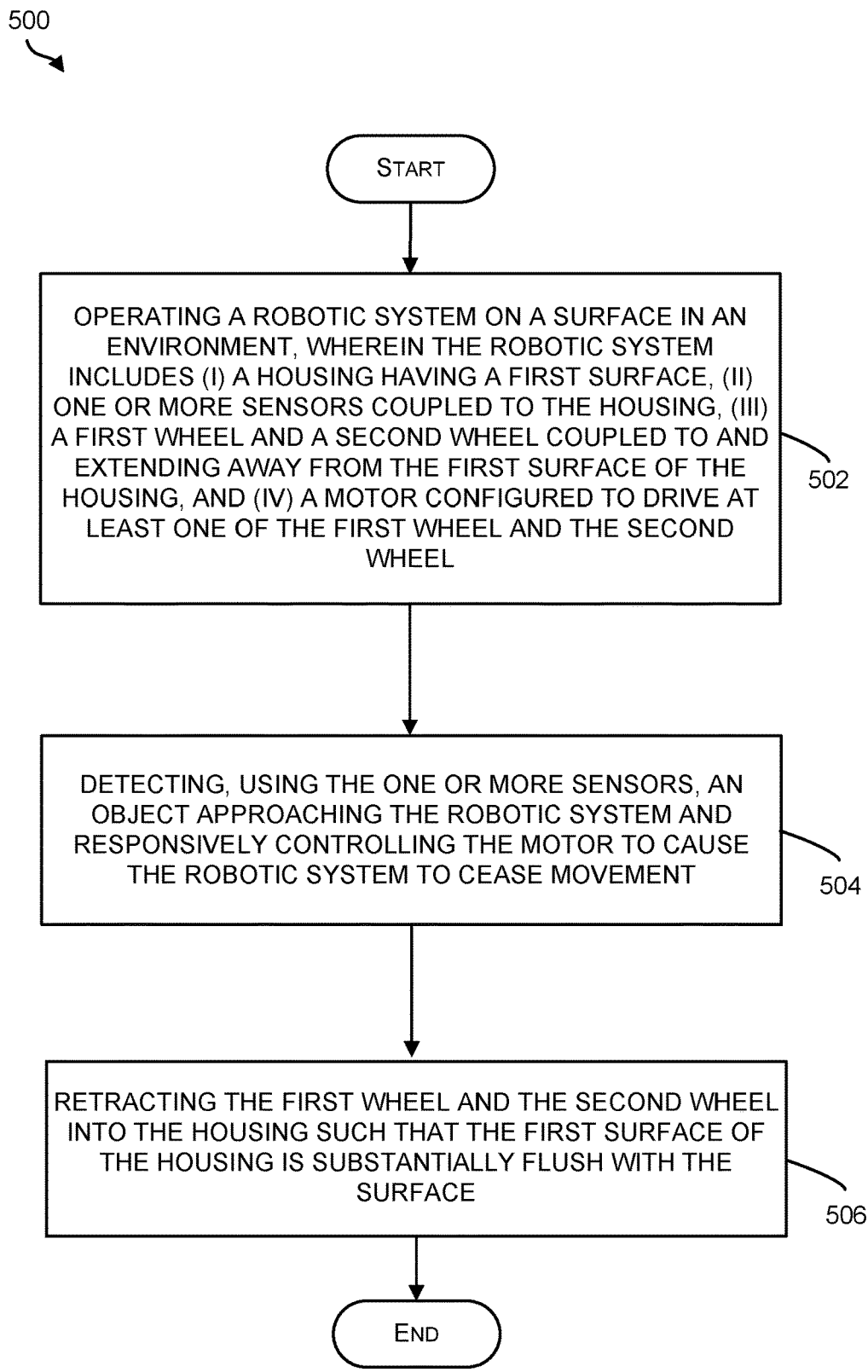
FIG. 8 is a flowchart of an example method, according to an example embodiment.

In FIG. 8, the blocks may represent operations and/or portions thereof and lines connecting the various blocks do not imply any particular order or dependency of the operations or portions thereof. It will be understood that not all dependencies among the various disclosed operations are necessarily represented. FIG. 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means +/−5%.

Illustrative, non-exhaustive examples, which may or may not be claimed, of the subject matter according the present disclosure are provided below.

Within examples, a robotic service cart is described herein. Example robotic systems described herein can deliver service items to passengers upon passenger demand. Further the design of the robotic system can allow passengers to access, for example, lavatories in an aircraft without blocking the aisle by enabling passengers to step on or over the robotic system to pass it. Sensors would be integrated to detect an approaching passenger and then briefly pause service to allow that passenger to pass over the service robot. The current service paradigm requires the flight attendants to move the service cart and stop their service to allow passengers to pass or for the passengers to simply wait. The robotic system described herein can eliminate the issue of flight attendants and conventional service carts blocking the aisle and access during servicing.

Various other features of the example systems discussed above, as well as methods for using these systems, are also described hereinafter with reference to the accompanying figures.

With reference to the Figures, FIG. 1 illustrates an example configuration of a robotic system that may be used in connection with the implementations described herein. The robotic system 100 may be configured to operate autonomously, semi-autonomously, and/or using directions provided by user(s).

As shown in FIG. 1, the robotic system 100 may include sensor(s) 102, power source(s) 104, a propulsion system 106, and a control system 108. The robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

The sensor(s) 102 may include, for example, one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robotic system 100 (e.g., sensors that are positioned on other robots or located within the environment in which the robotic system 100 is operating).

The sensor(s) 102 may provide sensor data to the control system 108 to allow for interaction of the robotic system 100 with its environment, as well as monitoring of the operation of the robotic system 100. The sensor data may be used in evaluation of various factors for activation, movement, and deactivation of the propulsion system 106 by the control system 108. For example, the sensor(s) 102 may capture data corresponding to the objects in the environment, which may assist with environment recognition and navigation. In an example configuration, sensor(s) 102 may include RADAR, LiDAR, infrared (IR), ultrasonic, one or more cameras (e.g., stereoscopic cameras for 3D vision), a global positioning system (GPS) transceiver, and/or other sensors for capturing information of the environment in which the robotic system 100 is operating. In another example, the sensor(s) 102 may include one or more velocity and/or acceleration sensors. For instance, the sensor(s) 102 may include an inertial measurement unit (IMU). The sensor(s) 102 may monitor the environment in real time, and detect obstacles and/or other aspects of the environment.

Further, the robotic system 100 may include sensor(s) 102 configured to receive information indicative of the state of the robotic system 100, including sensor(s) 102 that may monitor the state of the various components of the robotic system 100. The sensor(s) 102 may measure activity of systems of the robotic system 100 and receive information based on the operation of the various features of the robotic system 100, such the operation of extendable legs, arms, or other mechanical and/or electrical features of the robotic system 100. The data provided by the sensor(s) 102 may enable the control system 108 to determine errors in operation as well as monitor overall operation of components of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 104 configured to supply power to various components of the robotic system 100. Among other possible power systems, the robotic system 100 may include, for example, a hydraulic system, electrical system, batteries, electrical power, a gasoline engine, and/or other types of power systems. As an example illustration, the robotic system 100 may include one or more batteries configured to provide charge to components of the robotic system 100. The power source(s) 104 may charge using various types of charging, such as wired connections to an outside power source, wireless charging, combustion, or other examples.

The propulsion system 106 may be configured to provide powered motion for the robotic system 100. As illustrated in FIG. 1, the propulsion system 106 may include wheel(s) 110, motor(s) 112, and encoder(s) 114.

The wheel(s) 110 may include various types of wheel, such as, for example, a single wheel, double wheel, compound wheel, castor wheel, or any other wheel configured to rotate to move the robotic system 100 along a heading (e.g., steering direction) of the wheel(s) 110. The wheel(s) 110 may include one or more solid materials suitable for performing the function of the wheel(s) 110 such as plastic, composite, metal, metal compound, etc. By way of example, a castor wheel may be configured to roll along a straight line path, or mounted on a pivot (e.g., swivel, etc.) such that the wheel(s) 110 may align with a direction of travel. Additionally, in some examples, the wheel(s) 110 may include an energy-absorbing material (e.g., rubber, etc.) to facilitate operation and/or maintenance of the wheel(s) 110. For example, the wheel(s) 110 may include a tire coupled to a tire rim. The wheel(s) 110 may be coupled to and extend away from a housing of the robotic system 100, as discussed in additional detail below. In various examples, the wheel(s) 110 may comprise, for example, two wheels, three wheels, four wheels, six wheels, or eight wheels.

The motor(s) 112 may be configured to rotate the wheel(s) 110 about a rolling axis of the wheel(s) 110. Thus, for example, the motor(s) 112 may cause the wheel(s) 110 to move forward or backward. The motor(s) 112 may further be configured to rotate the wheel(s) 110 about a steering axis of the wheel(s) 110. Thus, for example, the motor(s) 112 may adjust a steering angle or direction of the wheel(s) 110 to thereby direct the robotic system 100 to a target location in the environment. The motor(s) 112 may include any combination of motors such as, for example, an electric motor, a steam motor, a sterling motor, a combustion motor, or any other motor. In some examples, the motor(s) 112 may include multiple types of motors. For example, a gas-electric hybrid device may include a gasoline engine and an electric engine that are intermittently activated as the motor(s) 112. Other examples are possible as well.

The encoder(s) 114 may be coupled to the motor(s) 112 and configured to provide data indicative of motion of the motor(s) 112. As used herein, the term "encoder" means any sensor or device used to detect angular position. For example, the encoder(s) 114 may include, For example, a rotary encoder, a shaft encoder, a potentiometer, or any other electro-mechanical device configured to convert an angular position/motion of a shaft of the motor(s) 112 to an analog or digital signal (e.g., the data, etc.). Various implementations are possible for the encoder(s) 114, such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

Additionally or alternatively, in some examples, the encoder(s) 114 may include an absolute encoder configured to provide the data. The absolute encoder, for example, may be configured to detect motion/change in orientations of the motor(s) 112 even if the absolute encoder is not provided with power. In these examples, the encoder(s) 114 may provide the data indicative of the orientations of the motor(s) 112 without the robotic system 100 rotating a given wheel until the signal (e.g., index pulse) is received from the encoder.

Accordingly, in some examples, the data provided by the encoder(s) 114 may be conditioned as inputs to a control loop (e.g., the control system 108) and outputs of the control loop may be conditioned as inputs to the power source(s) 104 to cause the motion of the robotic system 100.

As shown in FIG. 1, the control system 108 may include processor(s) 116, data storage 118, controller(s) 122, and communication link(s) 124. Processor(s) 116 may operate as one or more general-purpose hardware processors or special purpose hardware processors (e.g., digital signal processors, application specific integrated circuits, etc.). The processor(s) 116 may be configured to execute computer-readable program instructions 120 stored in the data storage 118. The processor(s) 116 may also directly or indirectly interact with other components of the robotic system 100, such as sensor(s) 102, power source(s) 104, propulsion system 106, and/or communication link(s) 124.

The data storage 118 may be one or more types of hardware memory. For example, the data storage 118 may include or take the form of one or more computer-readable storage media that can be read or accessed by processor(s) 116. The one or more computer-readable storage media can include volatile and/or non-volatile storage components, such as optical, magnetic, organic, or another type of memory or storage, which can be integrated in whole or in part with processor(s) 116. In some implementations, the data storage 118 can be a single physical device. In other implementations, the data storage 118 can be implemented using two or more physical devices, which may communicate with one another via wired or wireless communication. As noted previously, the data storage 118 may include the computer-readable program instructions 120, as well as additional data. The additional data may be any type of data, such as configuration data, sensor data, and/or diagnostic data, among other possibilities.

The controller 122 may include one or more electrical circuits, units of digital logic, computer chips, and/or microprocessors that are configured to (perhaps among other tasks), interface between any combination of the sensor(s) 102, the power source(s) 104, the propulsion system 106, the control system 108, the communication link(s) 124, and/or a user of the robotic system 100. In some implementations, the controller 122 may be a purpose-built embedded device for performing specific operations with one or more subsystems of the robotic system 100.

The control system 108 may monitor and physically change the operating conditions of the robotic system 100. In doing so, the control system 108 may serve as a link between portions of the robotic system 100, such as between sensor(s) 102 and/or the propulsion system 106, between the robotic system 100 and another computing device, and/or or between the robotic system 100 and a user. The example interfaces and communications noted above may be implemented via a wired or wireless connection, or both. The control system 108 may perform other operations for the robotic system 100 as well.

In some implementations, the control system 108 of robotic system 100 may also include communication link(s) 124 configured to send and/or receive information. The communication link(s) 124 may transmit data indicating the state of the various components of the robotic system 100. For example, information read by sensor(s) 102 may be transmitted via the communication link(s) 124 to a separate device. Other diagnostic information indicating the integrity or health of the power source(s) 104, propulsion system 106, processor(s) 116, data storage 118, and/or controller 122 may be transmitted via the communication link(s) 124 to an external communication device.

In some implementations, the robotic system 100 may receive information at the communication link(s) 124 that is then processed by the processor(s) 116. The received information may indicate data that is accessible by the processor(s) 116 during execution of the program instructions 120. Further, the received information may change aspects of the controller(s) 122 that may affect the behavior of the propulsion system 106.

In some cases, the communication link(s) 124 may include a wired connection. The robotic system 100 may include one or more ports to interface the communication link(s) 124 to an external device. The communication link(s) 124 may include, in addition to or as an alternative to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 108 may communicate with other systems of the robotic system 100 via wired or wireless connections, and may further be configured to communicate with one or more users of the robotic system 100. As one possible illustration, the control system 108 may receive an input (e.g., from a user or from another robot) indicating an instruction to perform a particular set of one or more tasks. The input to control system 108 may be received via the communication link(s) 124. Based on this input, the control system 108 may perform operations to cause the robotic system 100 to perform the one or more tasks.

Operations of the control system 108 may be carried out by the processor(s) 116. Alternatively, these operations may be carried out by the controller 122, or a combination of the processor(s) 116 and the controller 122. In some implementations, the control system 108 may partially or wholly reside on a device other than the robotic system 100, and therefore may at least in part control the robotic system 100 remotely. The communication link(s) 124 may be used at least in part to carry out the remote communication.

FIGS. 2A-4B illustrate an example robotic system 200. Robotic system 200 may be used to carry out the operations described herein. The robotic system 200 may correspond to the robotic system 100 shown in FIG. 1, and may be configured to perform some of the implementations described herein. Thus, the robotic system 200 may include one or more of sensor(s) 102, power source(s) 104, propulsion system 106, and/or control system 108.

Figure 2A:
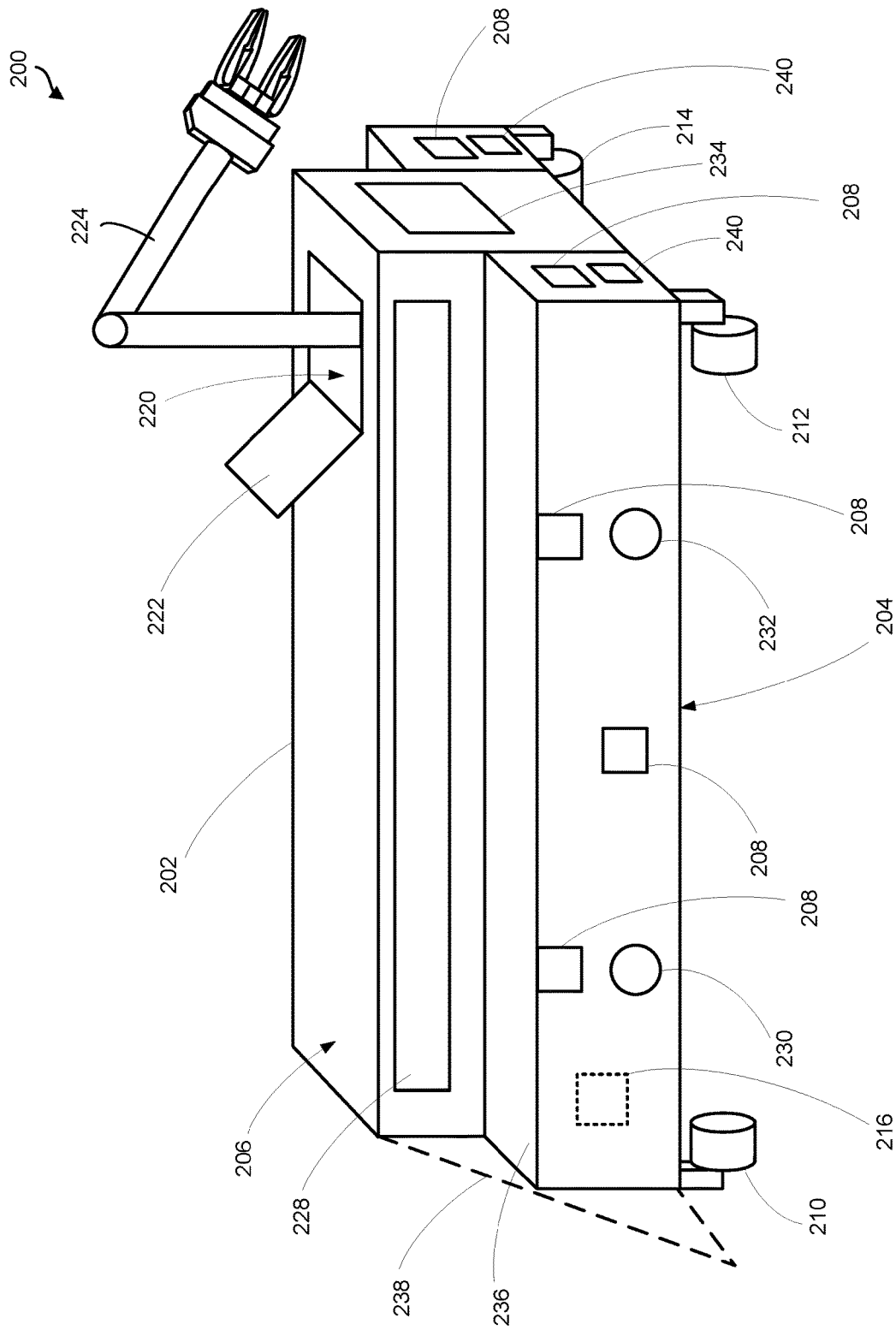
FIG. 2A is a perspective view of an example robotic system with a robotic arm, according to an example embodiment.

As shown in FIG. 2A, the robotic system 200 includes a housing 202 having a first surface 204 and a second surface 206 opposite the first surface 204. The robotic system 200 also includes one or more sensors 208 coupled to the housing. The one or more sensors 208 may include any of the features of sensor(s) 102 described above with respect to FIG. 1. The robotic system 200 further includes a first wheel 210 and a second wheel 212 coupled to and extending away from the first surface 204 of the housing 202. The first wheel 210 and the second wheel 212 may include any of the features of wheel(s) 110 described above with respect to FIG. 1. In one embodiment, as shown in FIG. 2A, the robotic system 200 further includes a third wheel 214 and a fourth wheel (not shown) coupled to and extending away from the first surface 204 of the housing 202. The robotic system 200 may include any number of wheels, including but not limited to two wheels, three wheels, four wheels, six wheels, or eight wheels. The robotic system 200 may further include a motor 216 configured to drive at least one of the first wheel 210 and the second wheel 212. The motor 216 may include any of the features of motor(s) 112 described above with respect to FIG. 1.

The robotic system 200 may further include data storage 118 including program instructions 120 stored thereon that when executed by one or more processors 116 of the robotic system 200 while operating in an environment, cause the robotic system 200 to perform various operations. The operations may include (i) controlling the motor 216 to cause the robotic system 200 to navigate on a surface 218 within the environment based on data received from the one or more sensors 208, (ii) detecting, using the one or more sensors 208, an object approaching the robotic system 200 and responsively controlling the motor 216 to cause the robotic system 200 to cease movement, and (iii) retracting the first wheel 210 and the second wheel 212 into the housing 202 such that the first surface 204 of the housing is substantially flush with the surface 218 within the environment. In the example embodiment where the robotic system 200 includes a third wheel 214 and a fourth wheel (not shown), the operations may further include retracting the third wheel 214 and the fourth wheel (not shown) into the housing 202 such that the first surface 204 of the housing 202 is substantially flush with the surface 218 in response to detecting the object approaching the robotic system 200. As us used herein, "substantially flush" means the first surface 204 contacts the surface 218, the first surface 204 lays on the surface 218, the first surface is less than 2 cm above the surface 218, the first surface 204 is between 0 cm units and 2 cm above the surface 218, no noticeable space exists between the first surface 204 and the surface 218, some acceptable space (e.g., less than 2 cm) exists between the first surface 204 and the surface 218.

As shown in FIG. 2A, the housing 202 of the robotic system 200 may further include a cavity 220 positioned between the first surface 204 and the second surface 206. In one example, the housing 202 includes a retractable door 222 positioned over the cavity 220. The cavity 220 may be refrigerated in one example. In such examples, the operations of the robotic system 200 may further include closing the retractable door 222 in response to detecting the object approaching the robotic system 200. Additional openings and doors could be implemented on the housing 202 to allow a person to access the cavity 220 for servicing (for example, restocking) the unit.

Figure 2B:
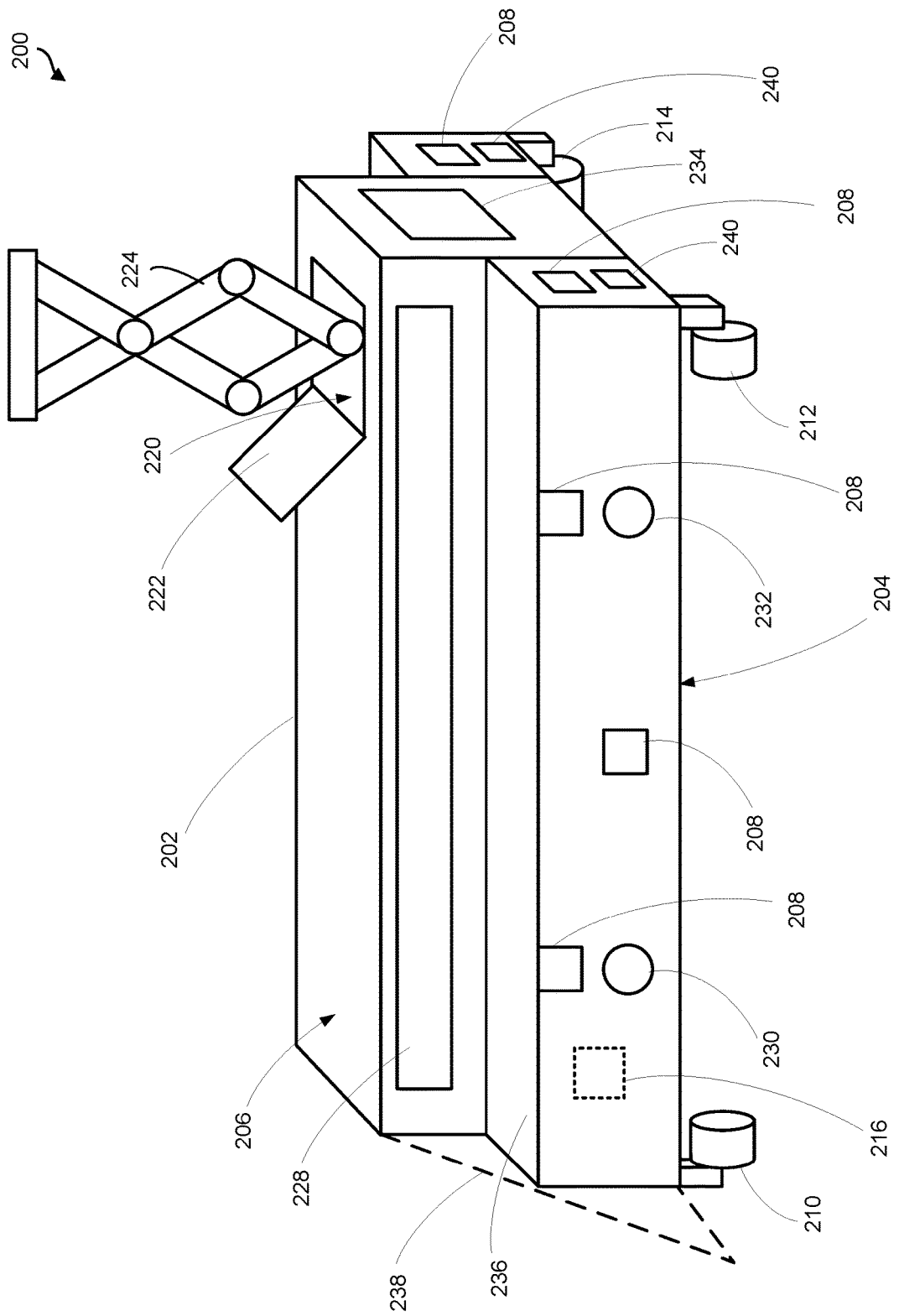
FIG. 2B is a perspective view of an example robotic system with a scissor lift mechanism, according to an example embodiment.

In one example, the operations of the robotic system 200 further include (i) receiving, via a wireless communication link 124 of the robotic system 200, a request for delivery of an item to a location in the environment, and (ii) controlling the motor 216 to cause the robotic system 200 to navigate on the surface within the environment to the location based on data received from the one or more sensors 208. In one such example, the retractable door 222 is configured to open to reveal the item that has been requested by the passenger. In another example, as shown in FIG. 2A, the robotic system 200 further includes a robotic arm 224 positioned at least partially in the cavity 220. The robotic arm 224 is configured to extend out of the cavity 220 away from the second surface 206 of the housing 202 to deliver the item that has been requested by the passenger. In yet another embodiment, as shown in FIG. 2B, the robotic system 200 further includes a scissor lift mechanism 226 positioned in the cavity 220. The scissor lift mechanism 226 is configured to extend out of the cavity 220 away from the second surface 206 of the housing 202 to deliver the item that has been requested by the passenger. Other mechanisms are possible as well.

In another example, the operations of the robotic system 200 further include (i) in response to receiving the request for delivery of the item, determining that the housing 202 of the robotic system 200 does not include the item, and (ii) in response to determining that the robotic system 200 does not include the item, loading the item into the housing 202 via the robotic arm 224 of the robotic system 200.

Figure 3A:
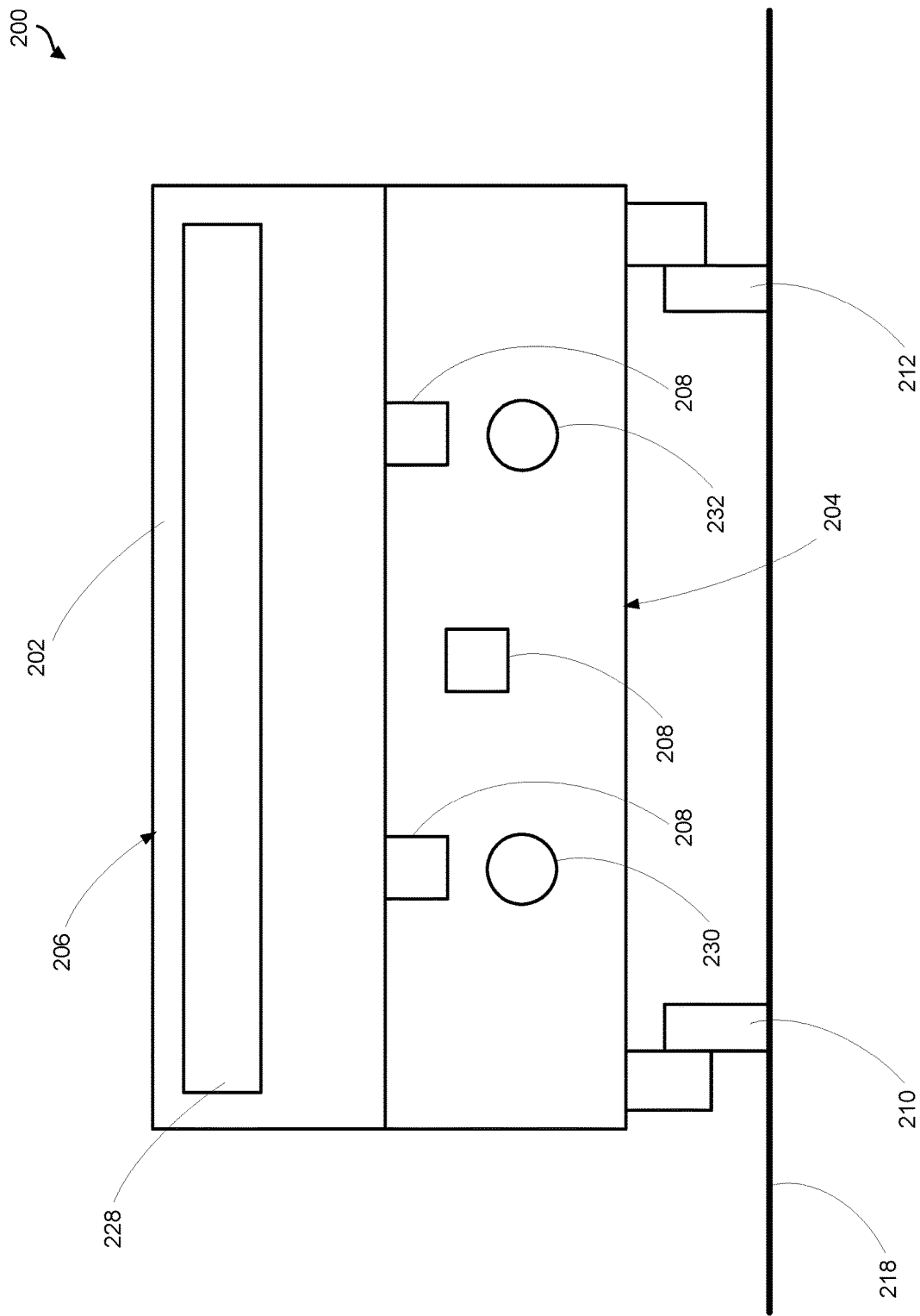
FIG. 3A is front view of the example robotic system of FIGS. 2A-2B with the wheels extended, according to an example embodiment.
Figure 3B:
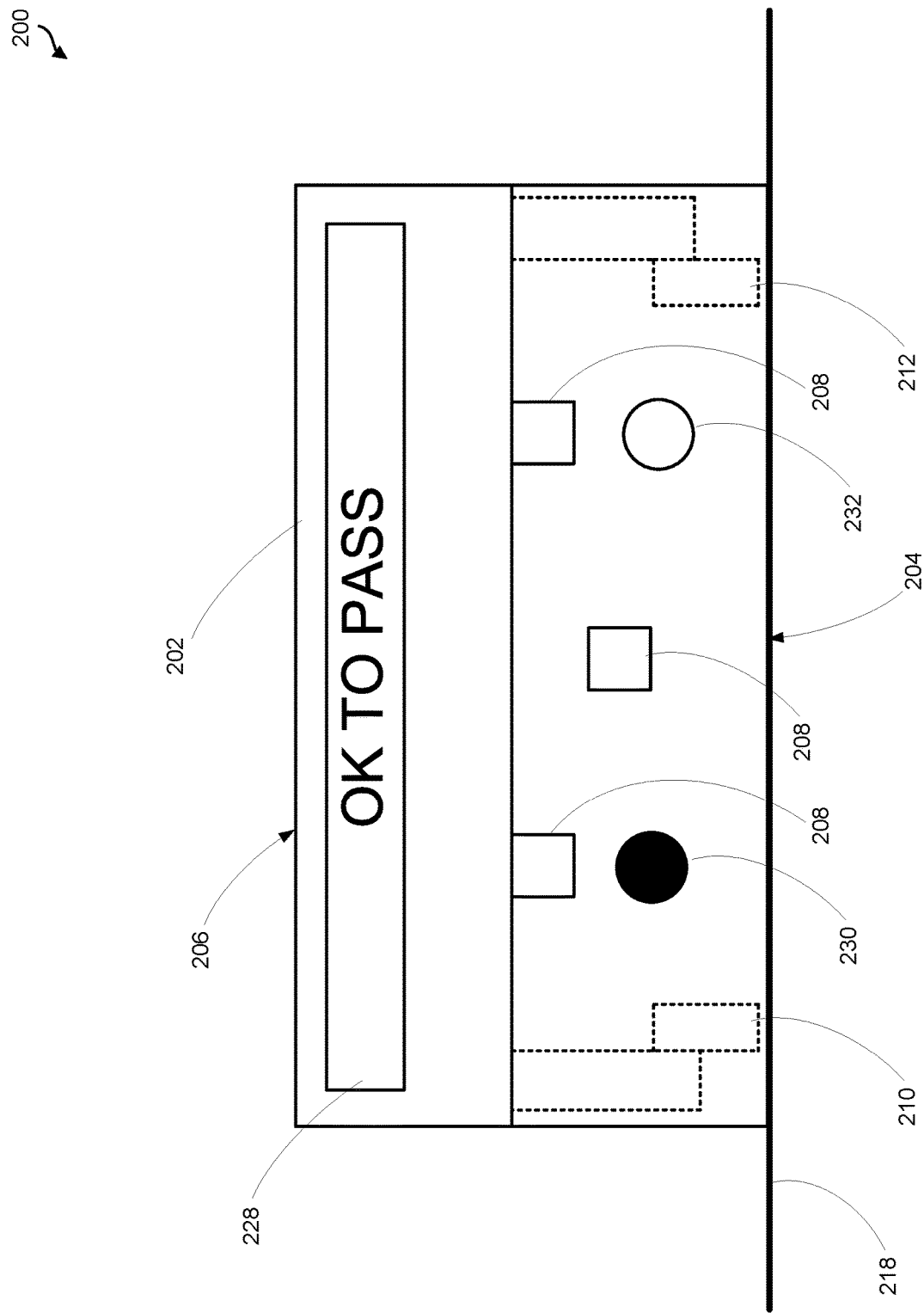
FIG. 3B is front view of the example robotic system of FIGS. 2A-2B with the wheels retracted, according to an example embodiment.

FIG. 3A illustrates a front view of the example robotic system of FIGS. 2A-2B with the wheels 210, 212 extended. As shown in FIG. 3A, the one or more sensors 208 may be positioned in front of any behind the robotic system 200 so it can detect obstacles in both directions. As further shown in FIG. 3, the robotic system 200 may further include a visual display 228 positioned on the housing 202. The visual display 228 provides a visual indication that the robotic system 200 is safe to pass over once the first wheel 210 and the second wheel 212 are retracted such that the first surface 204 of the housing 202 is substantially flush with the surface 218, as shown in FIG. 3B. In one example, the visual indication of the visual display 228 comprises a text-based indication, as shown in FIG. 3B. Additionally or alternatively, the visual indication may further comprise a color-based indication 230. For example, the color-based indication 230 may be red when the wheels 210, 212 of the robotic system 200 are extended, and then turn green when the wheels 210, 212 of the robotic system 200 are retracted and the robotic system 200 is safe to pass over. In yet another example, the robotic system 200 includes a speaker 232 positioned on the housing. The speaker 232 may be configured to provide an audio indication that the robotic system 200 is safe to pass over once the first wheel 210 and the second wheel 212 are retracted such that the first surface 204 of the housing 202 is substantially flush with the surface 218, as shown in FIG. 3B. In another example, the robotic system 200 may provide both the visual indication and the audio indication that the robotic system 200 is safe to pass over.

The first wheel 210 and the second wheel 212 may be retracted into the housing 202 through a variety of mechanisms. In one example, the robotic system 200 includes a hydraulic system or a pneumatic system to retract the first wheel 210 and the second wheel 212 into the housing 202 in response to detecting an object approaching the robotic system 200. In another example, the robotic system 200 includes jack screws coupled to one or more motors that are configured to retract the first wheel 210 and the second wheel 212 into the housing 202 in response to detecting an object approaching the robotic system 200. Other mechanisms for retracting the first wheel 210 and the second wheel 212 into the housing 202 are possible as well.

In another example, the robotic system 200 may include one or more locking mechanisms 240 configured to extend from the housing 202, as shown in FIGS. 2A-2B and FIGS. 4A-4B. The one or more locking mechanisms 240 are configured to extend from the housing 202 in response to determined turbulence in the aircraft, and lock onto a fixed surface (e.g., a seat or a docking station). In another example, the one or more locking mechanisms 240 may be used when the robotic system 200 is not in use (e.g., when the robotic system 200 is in a docking station).

FIG. 4A is a side view of the robotic system 20 with the wheels extended, according to an example embodiment. As shown in FIG. 4A, the one or more sensors 208 may further be positioned on the side surfaces of the housing 202. Further, the housing 202 may include a second retractable door 234 on the side surface(s) of the housing 202 to access the cavity 220. FIG. 4B is a side view of the robotic system 200 with the wheels retracted, according to an example embodiment.

In one embodiment, the surface 218 in the environment may comprise an aisle within an aircraft. In such an example, the second surface 206 of the housing 202 is configured to be stepped on or over to allow passage of a passenger in the aisle when the first wheel 210 and the second wheel 212 are retracted such that the first surface 204 of the housing 202 is substantially flush with the aisle surface 218. In one example, as shown in FIGS. 2A-2B, the robotic system 200 includes a step 236 between the first surface 204 and the second surface 206. Such a step 236 may enable a passenger to more easily step on or over the housing 202 to thereby allow passage of a passenger in the aisle. In another example, as shown in FIGS. 2A-2B, the robotic system 200 may include a sloped surface 238 between the first surface 204 and the second surface 206. Such a sloped surface 238 may enable a passenger to more easily step on or over the housing 202 to thereby allow passage of a passenger in the aisle. Other arrangements are possible as well.

The robotic system 200 may be sized to enable it to be stepped on or over to allow passage of a passenger in the aisle when the first wheel 210 and the second wheel 212 are retracted. In particular, the robotic system 200 may have a height less than about 2 feet when the first wheel 210 and the second wheel 212 are retracted, and a width less than about 15 inches.

Figure 5:
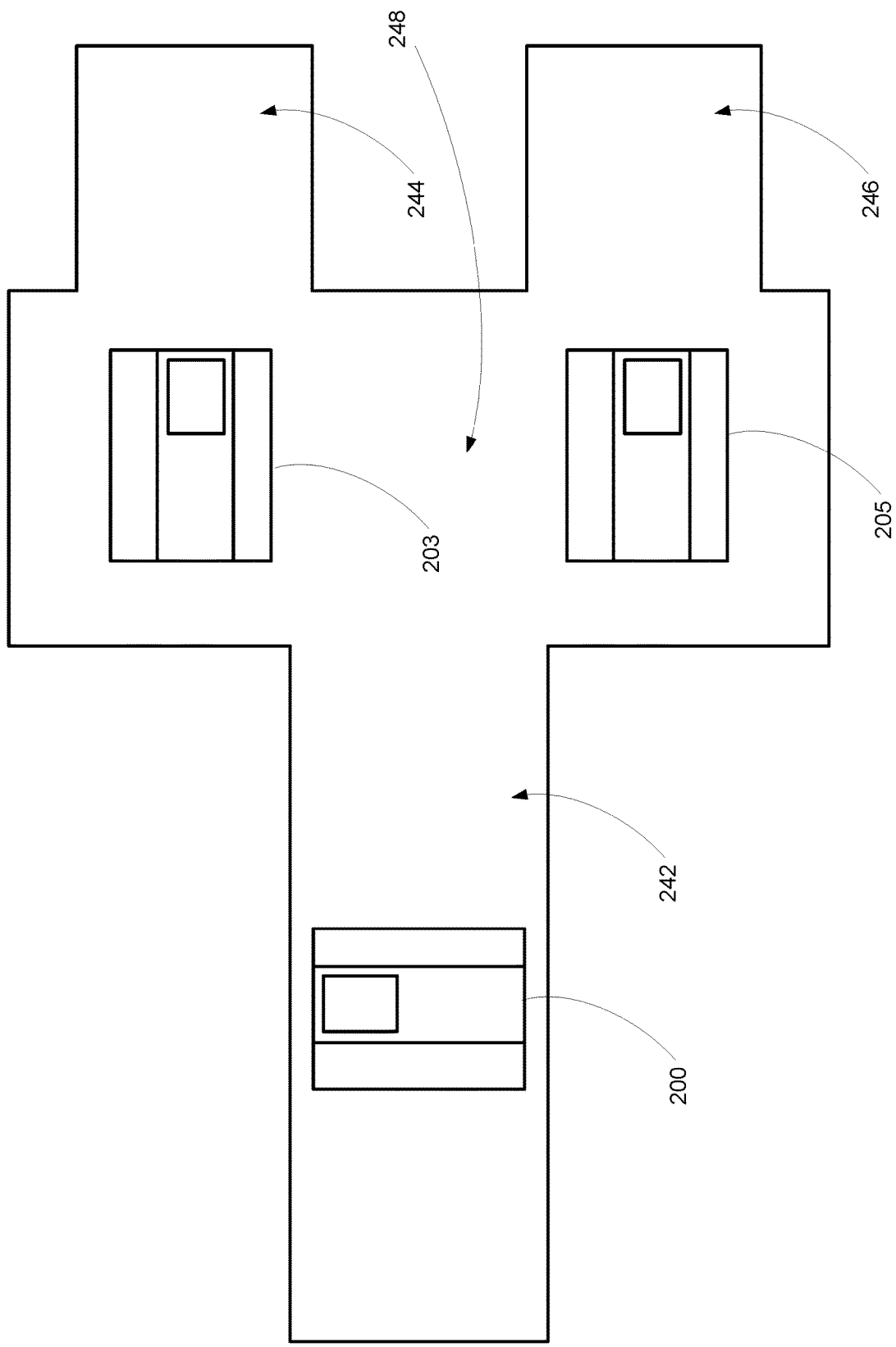
FIG. 5 is a top view of an example environment of the robotic system, according to an example embodiment.

FIG. 5 is a top view of an example environment of the robotic system, according to an example embodiment. As described above and as shown in FIG. 5, the environment in which the robotic system 200 operates may comprise an aisle 242 within an aircraft. As illustrated in FIG. 5, a robotic system 200 is shown in the aisle 242 during delivery of an item to a passenger. After the robotic system 200 delivers the item to the passenger, it may return to one of the docking stations 244, 246. The environment may further include a passing area 248 for multiple robotic systems departing as a group. FIG. 5 further illustrates a second robotic system 203 and a third robotic system 205 that are loaded and leaving their corresponding docking stations 244, 246. The docking stations 244, 246 may include an inventory of items for delivery to passengers on the aircraft. Further, the docking stations 244, 246 may include charging stations for the robotic systems 200, 203, 205.

While FIG. 5 and the various examples described herein illustrate operation of the robotic system 200 in an aircraft environment, the robotic system 200 may operate in other environments as well. For example, the robotic system 200 may operate in a ship, such as a cruise ship or other ship. In another example, the robotic system 200 may operate in a submarine. Other example environments are possible as well, and the above examples should not be construed as limiting.

Figure 6:
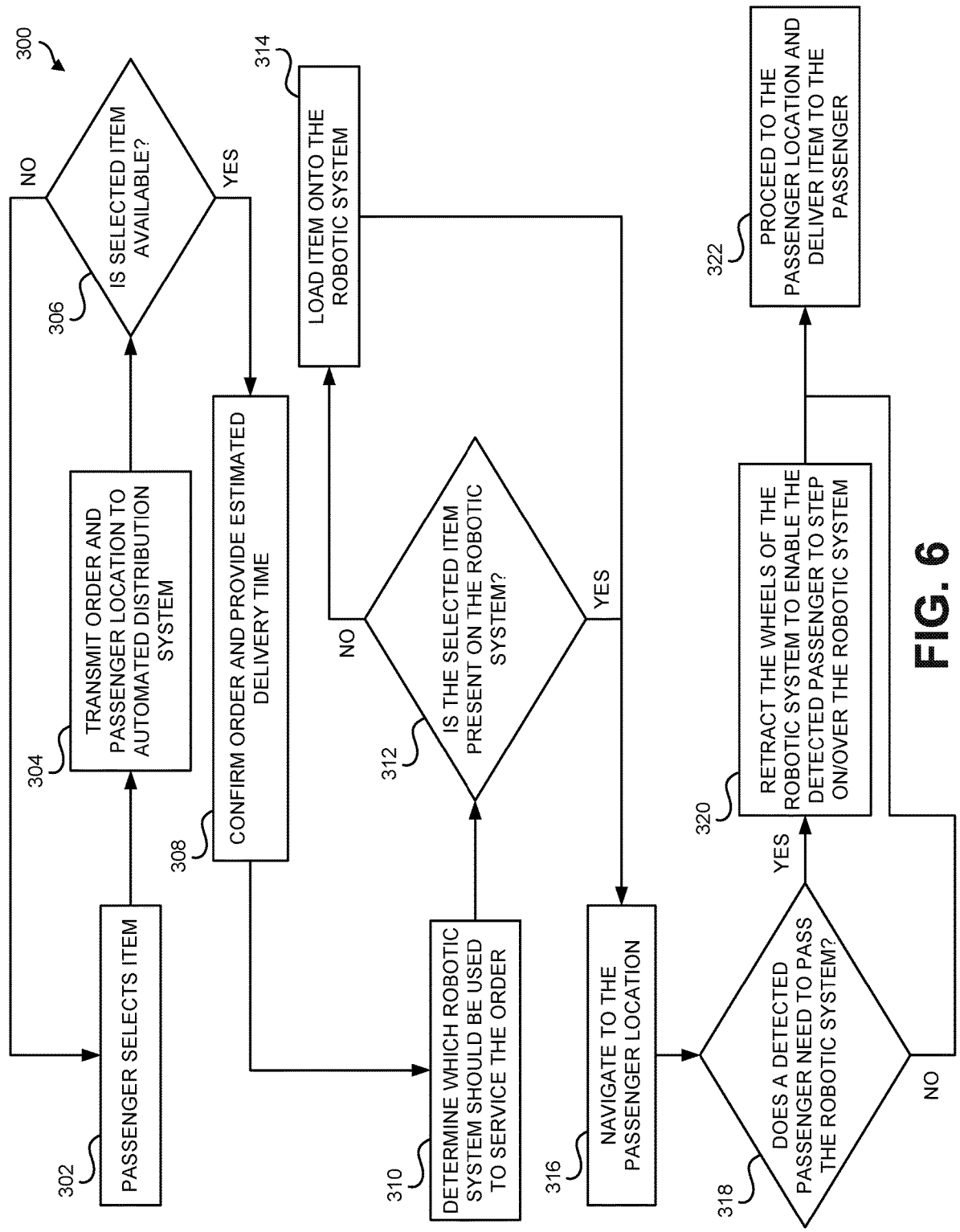
FIG. 6 is a flowchart of an example operation of a robotic system, according to an example embodiment.

FIG. 6 is a flowchart 300 of an example operation of the robotic system 200, according to an example embodiment. As shown in FIG. 6, the operation begins at block 302 a passenger selecting an item. The item may comprise a food item, a drink item, or an electronic item such as a tablet, a computing device, or headphones, as examples. In another example, the passenger may request pickup of trash as opposed to selecting an item. The selected item may be free of charge, or may require payment from the passenger. The passenger may select the item via seatback in-flight entertainment, or may select the item via a wirelessly connected personal electronic device, such as a smartphone, tablet, or other computing device.

The operation continues at block 304 with transmitting the order and passenger location to an automated distribution system. The location information may be received with an order identification number, and may further indicate a passenger name, row number, and/or seat number associated with the order. The automated distribution system may include one or more robotic systems 200. The operation continues at block 306 with determining whether the selected item is available. If the item is not available, the automated distribution system may supply a message to the passenger to select a different item. If the item is available, the operation continues at block 308 with automated distribution system transmitting an order confirmation message and an estimated delivery time.

The operation continues at block 310 with determining which robotic system should be used to service the order. Such a determination may be based on (i) determining whether any robotic systems already has the ordered item stored in their cavity, (ii) determining which robotic system is closest to the passenger, and/or some other factors. Once the determination is made as to which robotic system will deliver the ordered item to the passenger, the operation continues at block 312 with determining whether or not the selected item is already present in the robotic system 200. If the item is not already present in the robotic system, the operation continues at block 314 with loading the item onto the robotic system 200. In one example, the item is loaded onto the robotic system by a flight attendant. In another example, the item is loaded onto the robotic system by a robotic arm 224 of the robotic system 200. If it is determined that the item is already present on the robotic system 200, the operation continues at block 316. Common items may be pre-loaded into the cavity 220 of the housing 202.

The operation continues at block 316 with navigating to the passenger location. The passenger location may be a seat row, as an example. The robotic system 200 may navigate to the passenger location via a path determined to minimize service time based on airline determined factors (e.g., service class, frequent flyer status, ticket price, etc.). As the robotic system 200 navigates to the passenger location, the robotic system 200 may warn passengers of its presence either visually or audibly, and further uses its sensors 208 to detect the presence of standing passengers and/or other obstacles.

The operation continues at block 318 with determining whether or not a detected passenger needs to pass the robotic system 200. In one example, the robotic system 200 may cue the detected passenger (either through a textual-based visual indication or a audio indication) to determine if the passenger needs to pass the robotic device. If it is determined that the detected passenger does not need to pass the robotic system 200, the operation simply continues with block 322. If it is determined that the detected passenger needs to pass the robotic system 200, the operation continues with block 320 by retracting the first wheel 210 and the second wheel 212 of the robotic system 200 to enable the detected passenger to step on or over the robotic system 200. The operation then continues at block 322 with proceeding to the passenger location and delivering the item to the passenger.

Figure 7:
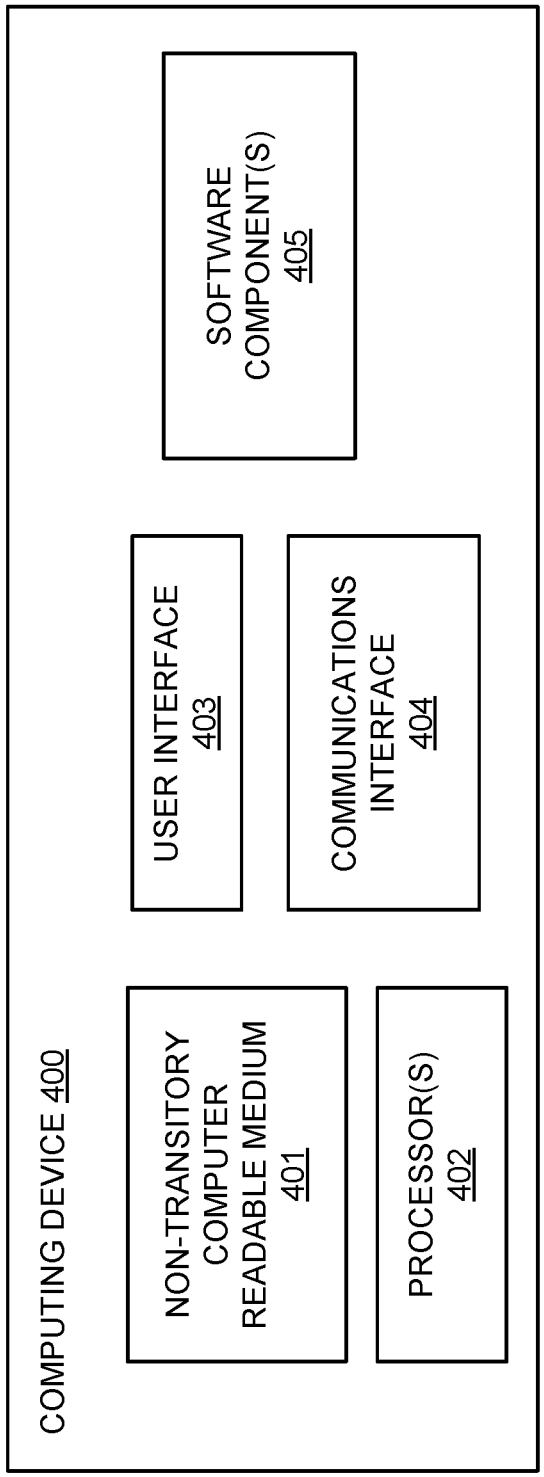
FIG. 7 is a block diagram of an example computing device, according to an example embodiment.

FIG. 7 illustrates a block diagram of an example computing device 400 that may be used to implement some or all of the operations discussed herein. For instance, the computing device 400 may be an onboard computer on the robotic system 100 or the robotic system 200 described above, or it may be a remote computer that is communicatively coupled to the robotic system 100 or the robotic system 200 via a communications link. Further, the computing device 400 shown in FIG. 7 might not be embodied by a single device, but may represent a combination of computing devices that may or may not be in the same location.

The computing device 400 may include a non-transitory, computer readable medium 401 that includes instructions that are executable by one or more processors 402. The non-transitory, computer readable medium 401 may include other data storage as well, such as navigation data. For example, the robotic system 100 or the robotic system 200 may store navigation data in the non-transitory, computer-readable medium 401 corresponding to a location of the docking station 244, 246 and/or a location (e.g., seat row) for various passengers in an aircraft.

In some implementations, the computing device 400 may include a user interface 403 for receiving inputs from a user, and/or for outputting operational data to a user. The user interface 403 might take the form of a control panel located on the robotic system 100, 200, a control panel at the docking station 244, 246, or a graphical user interface at a remote location (e.g., a seatback of a passenger in an aircraft), connected to the robotic system 100, 200 via a communications interface 404, among other examples. For instance, a command for the robotic system 100, 200 to navigate to the passenger with a food or drink item may be received from a remote user via the user interface 403. The command may be received by the robotic system 100, 200 via a communications interface 404. In other examples, operations of the robotic system 100, 200 might be initiated automatically, based on pre-determined parameters stored on the non-transitory, computer readable medium 401. Other possibilities also exist.

In addition, the non-transitory, computer readable medium 401 may be loaded with one or more software components 405 stored on the computer readable medium 401 and executable by the processor 402 to achieve certain functions. For example, the robotic system 100, 200 may include various systems that contribute to its operation, such as sensor(s) 102, power source(s) 104, propulsion system 106, and a control system 108, among other examples as discussed above. Each of these systems may be operated in part by software components 405 housed on the non-transitory, computer readable medium 401 and executable by the processor 402.

FIG. 8 is a block diagram of an example method. Method 500 shown in FIG. 8 presents an embodiment of a method that could be used by the robotic system 100 and/or robotic system 200 described above, as an example. Method 500 includes one or more operations, functions, or actions as illustrated by one or more of blocks 502-506. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, the method 500 can be caused to be performed by program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 8 may represent circuitry that is wired to perform the specific logical functions in the process.

Initially, at block 502, the method 500 includes operating a robotic system 200 on a surface 218 in an environment, wherein the robotic system 200 includes (i) a housing 202 having a first surface 204, (ii) one or more sensors 208 coupled to the housing 202, (iii) a first wheel 210 and a second wheel 212 coupled to and extending away from the first surface 204 of the housing 202, and (iv) a motor 216 configured to drive at least one of the first wheel 210 and the second wheel 212. The method continues at block 504 with detecting, using the one or more sensors 208, an object approaching the robotic system 200 and responsively controlling the motor 216 to cause the robotic system 200 to cease movement. The method continues at block 516 with retracting the first wheel 210 and the second wheel 212 into the housing 202 such that the first surface 204 of the housing 202 is substantially flush with the surface 218.

In one example, as discussed above, the surface 218 in the environment comprises an aisle 242 within an aircraft. In one such example, the object approaching the robotic system 200 comprises a passenger walking in the aisle 242 of the aircraft, and a second surface 206 of the housing 202 is configured to be stepped on to allow passage of the passenger in the aisle 242 when the first wheel 210 and the second wheel 212 are retracted such that the first surface 204 of the housing 202 is substantially flush with the aisle 242.

In one example, the method 500 further includes (i) receiving, via a wireless communication link 124 of the robotic system 200, a request for delivery of an item to a location in the environment, and (ii) controlling the motor 216 to cause the robotic system 200 to navigate on the surface 218 within the environment to the location based on data received from the one or more sensors 208. In such an example, the method 500 may further include (iii) in response to receiving the request for delivery of the item, determining that the housing 202 of the robotic system 200 does not include the item, and (iv) in response to determining that the robotic system 200 does not include the item, loading the item into the housing 202 via a robotic arm 224 of the robotic system 200.

In another example, the robotic system 200 further includes a visual display 228 positioned on the housing 202. In such an example, the method 500 may further include, in response to a determination that the first wheel 210 and the second wheel 212 have been retracted into the housing 202 such that the first surface 204 of the housing 202 is substantially flush with the surface 218, providing a visual indication that the robotic system 200 is safe to pass over. The visual indication may comprise a text-based indication or a color-based indication, as discussed above.

In another example, the robotic system 200 further includes a speaker 232 positioned on the housing 202. In such an example, the method 500 may further include, in response to a determination that the first wheel 210 and the second wheel 212 have been retracted into the housing 202 such that the first surface 204 of the housing 202 is substantially flush with the surface 218, providing an audio indication that the robotic system 200 is safe to pass over.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A robotic system comprising:
   a housing having a first surface and a second surface opposite the first surface;
   one or more sensors coupled to the housing;
   a first wheel and a second wheel coupled to and extending away from the first surface of the housing;
   a motor configured to drive at least one of the first wheel and the second wheel; and
   data storage including program instructions stored thereon that when executed by one or more processors of the robotic system while operating in an environment, cause the robotic system to perform operations comprising:
      controlling the motor to cause the robotic system to navigate on a surface within the environment based on data received from the one or more sensors;
      detecting, using the one or more sensors, a passenger approaching the robotic system and responsively controlling the motor to cause the robotic system to cease movement; and
      further in response to detecting the passenger approaching the robotic system, retracting the first wheel and the second wheel into the housing such that the first surface of the housing is substantially flush with the surface within the environment, wherein the housing includes a step or a sloped surface between the first surface and the second surface, and wherein the second surface of the housing is configured to be stepped on by the passenger to allow passage of the passenger over the robotic system when the first wheel and the second wheel are retracted.

2. The robotic system of claim 1, wherein the housing includes a cavity positioned between the first surface and the second surface.

3. The robotic system of claim 2, wherein the housing includes a retractable door positioned over the cavity.

4. The robotic system of claim 2, further comprising a robotic arm positioned in the cavity, wherein the robotic arm is configured to extend out of the cavity away from the second surface of the housing to deliver an item to a user.

5. The robotic system of claim 2, further comprising a scissor lift mechanism positioned in the cavity, wherein the scissor lift mechanism is configured to extend out of the cavity away from the second surface of the housing to deliver an item to a user.

6. The robotic system of claim 1, wherein the operations further comprise:
   receiving, via a wireless communication link of the robotic system, a request for delivery of an item to a location in the environment; and
   controlling the motor to cause the robotic system to navigate on the surface within the environment to the location based on data received from the one or more sensors.

7. The robotic system of claim 6, wherein the operations further comprise:
   in response to receiving the request for delivery of the item, determining that the housing of the robotic system does not include the item; and
   in response to determining that the robotic system does not include the item, loading the item into the housing via a robotic arm of the robotic system.

8. The robotic system of claim 1, further comprising a visual display positioned on the housing, wherein the visual display provides a visual indication that the robotic system is safe to pass over, and wherein the visual indication comprises one of a text-based indication or a color-based indication.

9. The robotic system of claim 1, further comprising a speaker positioned on the housing, wherein the speaker provides an audio indication that the robotic system is safe to pass over.

10. The robotic system of claim 1, further comprising a third wheel and a fourth wheel coupled to and extending away from the first surface of the housing, wherein the operations further comprise:
    retracting the third wheel and the fourth wheel into the housing such that the first surface of the housing is substantially flush with the surface in response to detecting the object approaching the robotic system.

11. A method comprising:
    operating a robotic system on a surface in an environment, wherein the robotic system includes (i) a housing having a first surface, (ii) one or more sensors coupled to the housing, (iii) a first wheel and a second wheel coupled to and extending away from the first surface of the housing, (iv) a visual display positioned on the housing, and (v) a motor configured to drive at least one of the first wheel and the second wheel;
    detecting, using the one or more sensors, an object a passenger approaching the robotic system and responsively controlling the motor to cause the robotic system to cease movement; and
    further in response to detecting the passenger approaching the robotic system, retracting the first wheel and the second wheel into the housing such that the first surface of the housing is substantially flush with the surface within the environment, wherein the housing includes a step or a sloped surface between the first surface and the second surface, and wherein the second surface of the housing is configured to be stepped on by the passenger to allow passage of the passenger over the robotic system when the first wheel and the second wheel are retracted.

12. The method of claim 11, further comprising:
    receiving, via a wireless communication link of the robotic system, a request for delivery of an item to a location in the environment; and controlling the motor to cause the robotic system to navigate on the surface within the environment to the location based on data received from the one or more sensors.

13. The method of claim 12, further comprising:
in response to receiving the request for delivery of the item, determining that the housing of the robotic system does not include the item; and
in response to determining that the robotic system does not include the item, loading the item into the housing via a robotic arm of the robotic system.

14. The method of claim 11, wherein the robotic system further includes a visual display positioned on the housing, the method further comprising:
in response to a determination that the first wheel and the second wheel have been retracted into the housing such that the first surface of the housing is substantially flush with the surface, providing a visual indication that the robotic system is safe for a passenger to pass over.

15. The method of claim 11, wherein the robotic system further includes a speaker positioned on the housing, the method further comprising:
in response to a determination that the first wheel and the second wheel have been retracted into the housing such that the first surface of the housing is substantially flush with the surface, providing an audio indication that the robotic system is safe for a passenger to pass over.

16. A non-transitory computer-readable medium having stored thereon instructions, that when executed by one or more processors, cause a robotic system to perform operations comprising:
operating a robotic system on a surface in an environment, wherein the robotic system includes (i) a housing having a first surface, (ii) one or more sensors coupled to the housing, (iii) a first wheel and a second wheel coupled to and extending away from the first surface of the housing, and (v) a motor configured to drive at least one of the first wheel and the second wheel;
detecting, using the one or more sensors, a passenger approaching the robotic system and responsively controlling the motor to cause the robotic system to cease movement; and
further in response to detecting the passenger approaching the robotic system, retracting the first wheel and the second wheel into the housing such that the first surface of the housing is substantially flush with the surface within the environment, wherein the housing includes a step or a sloped surface between the first surface and the second surface, and wherein the second surface of the housing is configured to be stepped on by the passenger to allow passage of the passenger over the robotic system when the first wheel and the second wheel are retracted.

17. The non-transitory computer-readable medium of claim 16, wherein the operations further comprise:
receiving, via a wireless communication link, a request for delivery of an item to a location in the environment; and
controlling the motor to cause the robotic system to navigate on the surface within the environment to the location based on data received from the one or more sensors.

18. The non-transitory computer-readable medium of claim 17, wherein the operations further comprise:
in response to receiving the request for delivery of the item, determining that the housing of the robotic system does not include the item; and
in response to determining that the robotic system does not include the item, loading the item into the housing via a robotic arm of the robotic system.

19. The non-transitory computer-readable medium of claim 16, wherein the robotic system further includes a visual display positioned on the housing, and wherein the operations further comprise:
in response to a determination that the first wheel and the second wheel have been retracted into the housing such that the first surface of the housing is substantially flush with the surface, providing a visual indication that the robotic system is safe for a passenger to pass over.

20. The non-transitory computer-readable medium of claim 16, wherein the robotic system further includes a speaker positioned on the housing, and wherein the operations further comprise:
in response to a determination that the first wheel and the second wheel have been retracted into the housing such that the first surface of the housing is substantially flush with the surface, providing an audio indication that the robotic system is safe for a passenger to pass over.

* * * * *